United States Patent [19]
Vion

[11] Patent Number: 4,793,926

[45] Date of Patent: Dec. 27, 1988

[54] LAMELLAR DECANTER

[75] Inventor: Patrick Vion, Houilles, France

[73] Assignee: Societe Degremont, S.A., Rueil-Malmaison, France

[21] Appl. No.: 39,177

[22] Filed: Apr. 17, 1987

[30] Foreign Application Priority Data

May 7, 1986 [FR] France ............................. 86 06638

[51] Int. Cl.[4] ............................................ B01D 21/00
[52] U.S. Cl. ................................................... 210/521
[58] Field of Search ................ 210/513, 519, 521, 522

[56] References Cited

U.S. PATENT DOCUMENTS

| | | | |
|---|---|---|---|
| 3,744,643 | 7/1973 | Tsunoda | 210/522 |
| 3,794,167 | 2/1974 | Olgard et al. | 210/519 |
| 4,036,664 | 7/1977 | Priebe | 210/521 |
| 4,127,488 | 11/1978 | Bell et al. | 210/519 |
| 4,305,819 | 12/1981 | Kobozev et al. | 210/521 |

*Primary Examiner*—Ivars Cintins
*Attorney, Agent, or Firm*—Sandler & Greenblum

[57] ABSTRACT

An ascending flux lamellar decantation apparatus for treating a liquid having a plurality of parallel lamellar modules which define a plurality of ducts disposed within an enclosure. The apparatus includes a channel aligned parallel to the lamellar modules for introducing liquids into the apparatus. The apparatus further includes a repartition device for maintaining hydraulic flux of liquids, which repartition device is positioned above at least one of the lamellar modules. The repartition device is made of a plurality of hydraulically independent sections of substantially equal size such that the treated liquid flow in each section is equal. The repartition device further includes a treated liquid recovery means for collecting treated liquid.

15 Claims, 2 Drawing Sheets

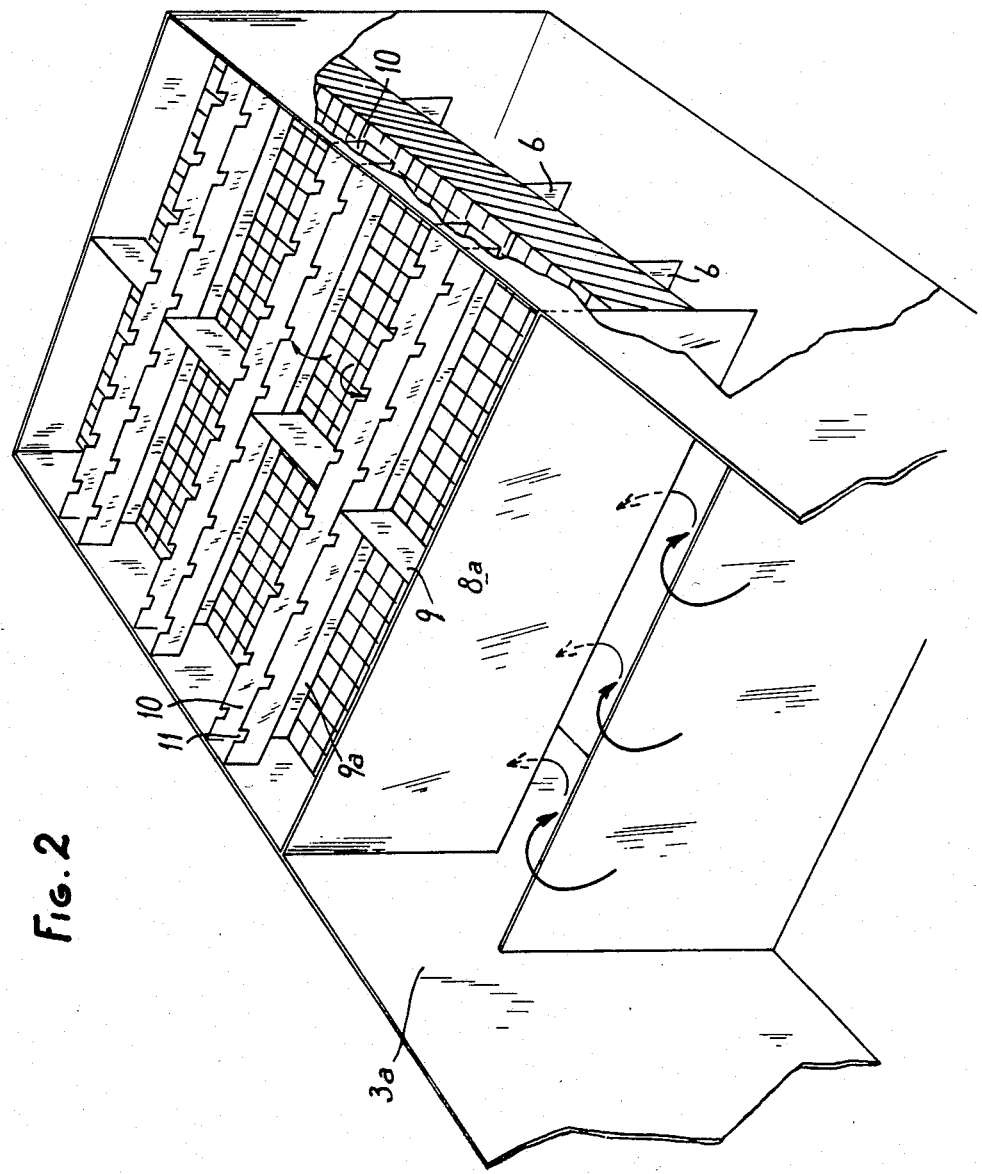

LAMELLAR DECANTER

FIELD AND BACKGROUND OF THE INVENTION

The present invention relates to a lamellar decantation or clarification apparatus, of the type of the ascending hydraulic flux, wherein the liquid flows from bottom to top of the apparatus, and provided for the clarification of liquids, notably of drinkable, industrial and urban residual waters.

It is known that the efficiency of the lamellar decanters is essentially tied to the repartition quality of the liquid to be treated on the whole lamellar decantation surface.

According to the design of the lamellar modules or ducts, it is possible to distinguish between two correct repartition types. In the case of lamellar modules formed of parallel plates, the distribution takes place downstream of the module, that is at the outlet of the treated liquid, via weirs placed where the plates open and pertaining to each duct defined by two plates.

In the case of lamellar modules formed of tubes, it is not possible to envisage such a recovery of the liquid, and the only repartition via a series of perforated chutes or collectors above the modules is illusive; this is the reason why the liquid is often distributed from upstream, that is when the liquid to be treated is introduced in the apparatus, all along the decanter via a perforated channel providing for the equidistribution of the liquid.

This distribution is detrimental to the tubular module lamellar decanters which are actually capable of much higher performances than the parallel plate decanters since there is a risk of deposits and of a deterioration of the flocculated particules, or flocks, at the level of the distribution orifices. For avoiding the destruction of the flocks, distribution channels of very large capacity would have to be used, with the risk of extra deposits and at the cost of a non negligible size increase of the works.

OBJECTS AND SUMMARY OF THE INVENTION

The present invention provides means for mitigating this disadvantage met in the repartition of the liquid in the tubular lamellar decanters by providing an efficient repartition downstream of the decanters, and allows also avoiding upstream, that is where the liquid is introduced in the lamellar modules, large horizontal fluxes in the vicinity of the modules, which would be detrimental to the flock decantation.

The ascending flux lamellar decantation apparatus according to the invention is characterized in that it is provided with a repartition system atop the lamellar modules fitting the apparatus and made of a partitioning system defining a plurality of areas of equal surface, hydraulically independent and provided with means for collecting the treated liquid, arranged such that the flow rate of each area of treated liquid be identical.

According to a feature of the invention, the recovery means of the treated liquid consist in notched chutes or tubes or chutes with calibrated orifices, the notches of the chutes or the orifices or the tubes or chutes being uniformly distributed and presenting the same characteristics in each area.

According to another aspect of the invention, the decanter lamellar area is divided into equal sectors by distribution and repartition plates placed underneath the lamellar system, each sector including an equal and determined number of collecting areas for the treated liquid.

BRIEF DESCRIPTION OF THE DRAWINGS

The various features and advantages of the invention will become more apparent from the reading of the following description of two of its possible embodiments, given only by way of non limiting examples.

This description is made with reference to the accompanying drawing in which

FIGS. 1 and 2 are perspective views, with cut-away portions, of decanters according to this invention.

DETAILED DESCRIPTION OF THE EMBODIMENTS

Figure 1:
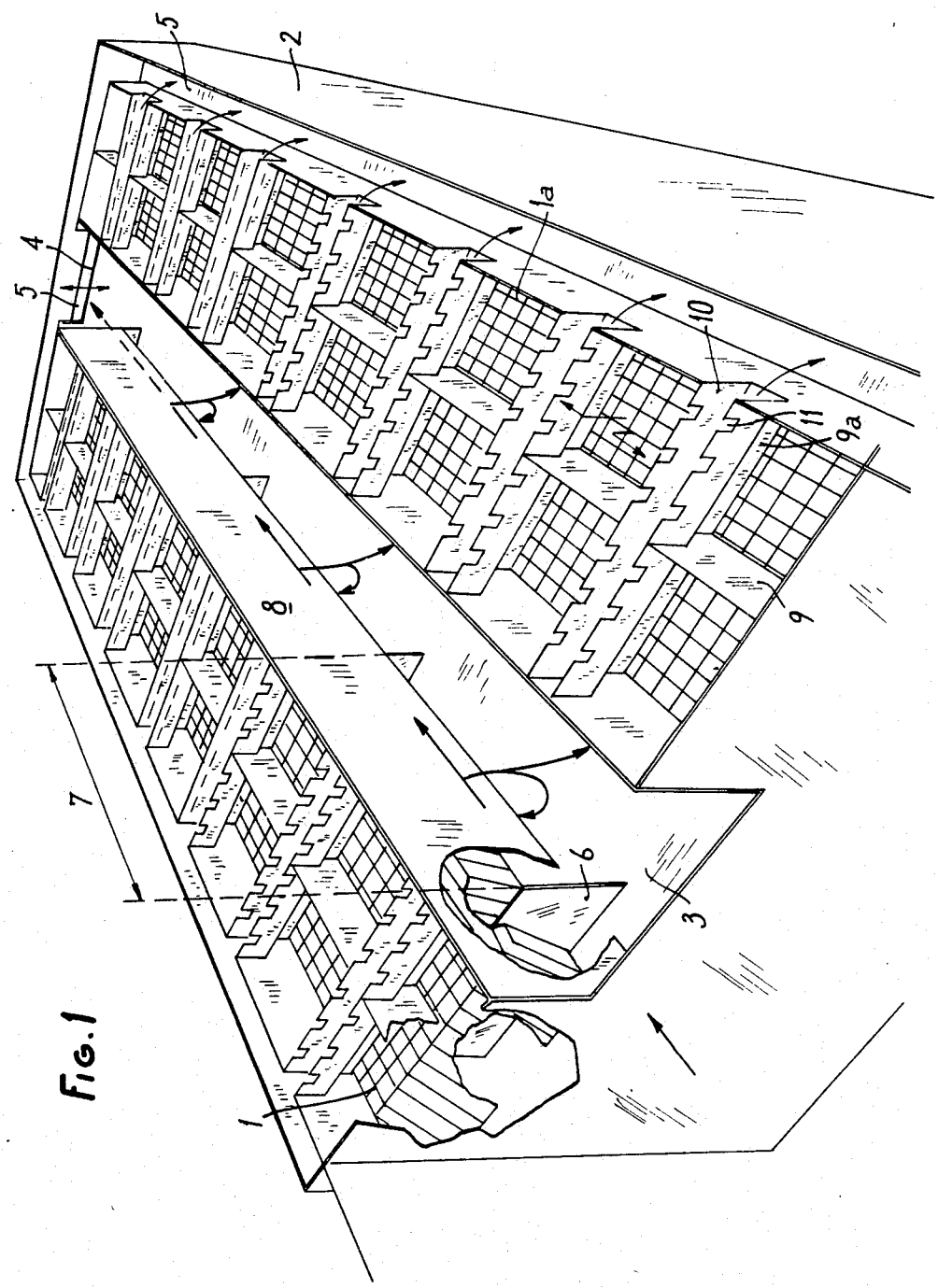

The apparatus includes, in the embodiment shown in FIG. 1, two assemblies of lamellar modules 1, 1a, placed in an enclosure 2 on either side of a channel 3 bringing the liquid to be treated, the channel being fed, according to the invention, from the top of the apparatus and ending into a weir 4 of adjustable height, placed atop the treated liquid collecting chutes 5.

Such measures adopted according to the invention allow the hydraulic flux of a liquid such as a flocculated water or a suspension, introduced with a certain speed and therefore with a certain kinetic energy, to be maintained relatively near the apparatus surface, the adjustable weir 4 provided at the end of channel 3 opposite the liquid inlet allowing, apart from the appeal it applies on the liquid flux, recovering clarified liquid at the channel end and discharging the particles floating on the surface, which would eventually accumulate in the channel end portion. The flow rate of the weir is a compromise between a rather high flow rate necessary for maintaining the liquid distribution flux at a sufficient level in the apparatus, and a flow rate sufficiently low for the overflow of the liquid to be of a quality close to that of the treated liquid.

The liquid flows through channel 3 and is distributed into the various lamellar sectors 7 defined by the lamellar modules repartition plates 6, as it progresses, by passing underneath the distribution longitudinal wall 8 the bottom level of which is higher than the lower level of plate 6.

The liquid repartition in the lamellar modules is provided according to the invention by a compartmentation formed above the modules by means of a partitioning system which is both longitudinal 9 and transversal 9a, bearing on the modules surface and on the decanted water collecting chutes 10. The chutes are each formed according to the invention with exactly the same number of orifices as the number of notches 11, which are all of the same size, through which the liquid, after its passage through the modules where it is decanted, flows into the chutes which open in turn into the decanted water channel 5.

This compartmentation according to the invention provides as many collecting areas for the treated liquid, such areas being bordered by the partitioning systems 9, 9a.

All of the areas are identical in surface and number of orifices 11 as are the chutes existing in the areas. The flow rate Q is therefore uniformly distributed between all the collecting areas as a unit flow rate:

$q_z = q/\text{number of areas}$

The repartition plates 6 provided underneath the modules divide the lamellar assembly into N elementar decanters or sectors, including each n collecting areas. The various sectors flowrates are identical and equal to $q_s$:

$q_s = Q/N = q_z n$

Since the repartition plates 6 are lower than wall 8, the flow rate appeal $q_s$ of an elementary decanter takes place in the bottom portion of the distribution channel rather than toward the sides, since the passage underneath the plates would form a longer path of travel generating a higher loss of load.

In the embodiment shown in FIG. 2, the apparatus is fed via a frontal channel 3a, with the interposition of a wall 8a playing a part similar to that of wall 8 of the apparatus shown in FIG. 1 but which is transversal in this case instead of being longitudinal. As regards the other elements, the dispositions adopted in this embodiment are identical to those just described with reference to FIG. 1. However, in the case of FIG. 2, walls 8 extend to a level which is less than that of the repartition plates 6 in order to carry the feeding hydraulic flux to a level lower than that of plates 6, so as to avoid any horizontal sweeping action underneath the modules.

The arrangements according to the invention allow obtaining a repartition of the treated liquid having a quality at least equal to that obtained with the arrangements using distribution channels—without presenting their hereabovementioned disadvantages—for collecting lamellar areas of 1 to 10 m² and a number of elementary sectors or decanters between 2 and 12 according to the apparatus size.

The apparatus according to the invention can be used for a wide range of flowrates which can vary between 20 and 5000 m³/hour.

Due to the quality of the repartition which it provides, the apparatus according to the invention allows avoiding any deterioration of the flock due to the absence of passages with distribution orifices, reducing the hydraulic sweeping actions underneath the modules, using the distribution channel as a kind of clearing device or predecanter relieving the lamellar area, passing the bottom scraper arms, if there is a scraper, in the liquid inlet channel or placing the treated water collecting channels therein, thereby reducing the extent of the civil engineering works.

Obviously, the invention is not limited to the embodiments just described and shown and it can encompass many variants without departing from its scope.

For example and instead of being made of inclined tubes as in the examples discussed above, the lamellar modules can also be made of inclined plates.

Also, the treated liquid recovery means may consist in tubes or chutes formed with calibrated orifices, instead of being made of notched chutes such as those described and shown in the accompanying drawings.

What I claim is:

1. An ascending flux lamellar decantation apparatus for treating a liquid, comprising:
   (a) a plurality of lamellar modules which comprise a plurality of ducts disposed within an enclosure, said lamellar modules being arranged in parallel relationship to one another;
   (b) at least one channel for introducing a liquid to be treated into the apparatus adjacent a first end of said channel, said channel running parallel to said lamellar modules;
   (c) a repartition device for maintaining hydraulic flux of a liquid to be treated positioned above at least one of said lamellar modules, said repartition device being divided into a plurality of hydraulically independent sections of substantially equal size such that the treated liquid flow in each said section is identical, said repartition device being provided with treated liquid recovery means for collecting the treated liquid.

2. The ascending flux lamellar decantation apparatus of claim 1, wherein at least one of said lamellar modules is divided into a plurality of lamellar sectors by a plurality of longitudinally extending lamellar module repartition plates disposed below said at least one lamellar module.

3. The ascending flux lamellar decantation apparatus of claim 2, wherein said channel is defined by a distribution longitudinal wall on opposite sides of said channel.

4. The ascending flux lamellar decantation apparatus of claim 3, wherein said treated liquid recovery means comprises at least one chute running perpendicularly to said channel and being disposed between said lamellar sectors.

5. The ascending flux lamellar decantation apparatus of claim 4, wherein said at least one chute comprises a plurality of uniformly distributed notches for allowing the treated liquid to flow through said notches and into said chute.

6. The ascending flux lamellar decantation apparatus of claim 5, wherein said chute opens into a decanted water channel, said decanted water channel running substantially parallel to said channel and along a portion of the perimeter of said apparatus.

7. The ascending flux lamellar decantation apparatus of claim 3, wherein said treated liquid recovery means comprises at least one tube running perpendicularly to said channel and being disposed between said lamellar sectors.

8. The ascending flux lamellar decantation apparatus of claim 7, wherein said at least one tube comprises a plurality of uniformly distributed orifices for allowing the treated liquid to flow through said orifices and into said tube.

9. The ascending flux lamellar decantation apparatus of claim 8, wherein said tube opens into a decanted water channel, said decanted water channel running substantially parallel to said channel and along a portion of the perimeter of said apparatus.

10. The ascending flux lamellar decantation apparatus of claim 3, wherein the bottom end of each of said longitudinally extending lamellar module repartition plates extends to a point lower than the bottom end of said distribution longitudinal wall.

11. The ascending flux lamellar decantation apparatus of claim 1, wherein said channel runs in between said lamellar modules.

12. The ascending flux lamellar decantation apparatus of claim 1, further comprising at least one adjustable weir positioned adjacent a second end of said channel for controlling the flow of liquid, said second end being opposite to said first end of said channel.

13. An ascending flux lamellar decantation apparatus for treating a liquid, comprising:
   (a) a plurality of lamellar modules which comprise a plurality of ducts disposed within an enclosure, said lamellar modules being arranged side by side and in parallel relationship to one another;
(b) at least one channel for introducing a liquid to be treated into the apparatus, said channel running parallel to said lamellar modules; and
(c) a repartition device for maintaining hydraulic flux of a liquid to be treated positioned above at least one of said lamellar modules, said repartition device being divided into a plurality of hydraulically independent sections of substantially equal size such that the treated liquid flow in each said section is identical, said repartition device being provided with treated liquid recovery means for collecting the treated liquid;
wherein said channel is disposed on one side of said lamellar modules and is separated by a partition wall.

14. The ascending flux lamellar decantation apparatus of claim 13, wherein at least one of said lamellar modules is divided into a plurality of lamellar sectors by a plurality of longitudinally extending lamellar module repartition plates disposed below said at least one lamellar module, wherein the bottom end of said partition wall extends to a point lower than the bottom end of each of said longitudinally extending lamellar module repartition plates.

15. An ascending flux lamellar decantation apparatus for treating a liquid, comprising:
(a) a plurality of lamellar modules which comprise a plurality of ducts disposed within an enclosure, said lamellar modules being arranged in parallel relationship to one another;
(b) at least one channel for introducing a liquid to be treated into the apparatus, said channel running parallel to and in between said lamellar modules; and
(c) a repartition device for maintaining hydraulic flux of a liquid to be treated positioned above at least one of said lamellar modules, said repartition device being divided into a plurality of hydraulically independent sections of substantially equal size such that the treated liquid flow in each said section is identical, said repartition device being provided with treated liquid recovery means for collecting the treated liquid.

* * * * *